US007717233B2

(12) United States Patent
Ashida

(10) Patent No.: US 7,717,233 B2
(45) Date of Patent: May 18, 2010

(54) OIL TANK FOR ENGINE-DRIVEN VEHICLE

(75) Inventor: Takashi Ashida, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1276 days.

(21) Appl. No.: 11/230,324

(22) Filed: Sep. 19, 2005

(65) Prior Publication Data

US 2006/0060174 A1 Mar. 23, 2006

(30) Foreign Application Priority Data

Sep. 17, 2004 (JP) ............................ 2004-271359

(51) Int. Cl.
*F01M 1/12* (2006.01)
*B01D 19/00* (2006.01)

(52) U.S. Cl. ........................ 184/6.13; 220/564; 96/212; 55/385.3

(58) Field of Classification Search .................. 184/6.5, 184/6.13; 220/562–564; 123/572, 573; 137/574, 576; 96/187, 204, 206, 216; 55/385.3, 55/477
See application file for complete search history.

(56) References Cited

U.S. PATENT DOCUMENTS

| | | | | | |
|---|---|---|---|---|---|
| 2,316,729 | A | * | 4/1943 | Tryon | 96/212 |
| 2,379,579 | A | * | 7/1945 | Hunter | 184/6.13 |
| 2,538,983 | A | * | 1/1951 | Sharples | 184/6.13 |
| 2,588,778 | A | * | 3/1952 | Tibeau | 137/112 |
| 2,705,053 | A | * | 3/1955 | Morris | 96/212 |
| 2,952,380 | A | * | 9/1960 | Hampton et al. | 220/565 |
| 2,995,268 | A | * | 8/1961 | Kurtovich | 244/135 R |
| 3,130,022 | A | * | 4/1964 | Clark | 96/187 |
| 3,635,182 | A | * | 1/1972 | Paffett | 114/267 |
| 3,882,967 | A | * | 5/1975 | Gulla et al. | 184/103.1 |
| 4,002,432 | A | * | 1/1977 | Brice et al. | 208/100 |
| 4,641,615 | A | * | 2/1987 | Ferguson | 123/196 AB |
| 5,165,561 | A | * | 11/1992 | Scheurenbrand et al. | 220/746 |
| 5,305,908 | A | * | 4/1994 | Otto et al. | 220/564 |
| 5,450,835 | A | * | 9/1995 | Wagner | 123/573 |
| 5,587,068 | A | * | 12/1996 | Aho et al. | 96/210 |
| 6,179,904 | B1 | * | 1/2001 | Knowles et al. | 96/189 |
| 6,206,228 | B1 | * | 3/2001 | Roth | 220/601 |
| 6,279,556 | B1 | * | 8/2001 | Busen et al. | 123/572 |
| 6,524,149 | B1 | * | 2/2003 | Hattori | 440/88 L |
| 6,626,163 | B1 | * | 9/2003 | Busen et al. | 123/572 |
| 6,739,319 | B2 | * | 5/2004 | Braun et al. | 123/509 |

(Continued)

FOREIGN PATENT DOCUMENTS

JP 2003-040191 2/2003

*Primary Examiner*—Bradley T King
*Assistant Examiner*—Thomas Irvin
(74) *Attorney, Agent, or Firm*—Keating & Bennett, LLP

(57) ABSTRACT

An oil tank uses centrifugal movement of oil to separate blow-by gases. The oil tank has a tank body with an internal oil chamber. The oil chamber is spaced from the walls of the oil tank. The oil is delivered to the oil chamber and the oil swirls along the inner wall of the oil chamber in a helical pattern thereby allowing separation between the oil and the blow-by gases. The oil settles in the bottom of the oil chamber, which is in fluid communication with the region defined between the tank body and the oil chamber. The oil chamber is placed in an off-center location relative to the bottom of the tank body.

20 Claims, 8 Drawing Sheets

U.S. PATENT DOCUMENTS

| | | | | |
|---|---|---|---|---|
| 7,244,293 | B2 * | 7/2007 | Morita et al. | 96/204 |
| 7,422,612 | B2 * | 9/2008 | Pietschner | 55/309 |
| 7,435,290 | B2 * | 10/2008 | Lane et al. | 96/210 |
| 2001/0042750 | A1 * | 11/2001 | Low et al. | 220/86.2 |
| 2003/0045187 | A1 | 3/2003 | Matsuda et al. | |
| 2006/0226155 | A1 * | 10/2006 | Roche et al. | 220/563 |
| 2007/0241115 | A1 * | 10/2007 | Baumann et al. | 220/564 |
| 2008/0116208 | A1 * | 5/2008 | Miyachi | 220/564 |

* cited by examiner

OIL TANK FOR ENGINE-DRIVEN VEHICLE

RELATED APPLICATIONS

This application claims the priority benefit under 35 U.S.C. §119 of Japanese Patent Application No. 2004-271359, filed on Sep. 17, 2004, which is hereby incorporated by reference in its entirety.

BACKGROUND OF THE INVENTION

1. Field of the Invention

The present invention generally relates to an oil tank for an engine-driven vehicle that separates oil from blow-by gas. More particular, the present invention relates to such an oil tank in which blow-by gas is separated from the oil by centrifugal action.

2. Description of the Related Art

In oil tanks, such as that disclosed in United States Published Patent Application No. 2003/0045187, published on Mar. 6, 2003, which claimed priority to Japanese Patent Application No. 2001-233362, filed on Aug. 1, 2001, there often is a mixture of oil and so-called blow-by gases. The oil tank disclosed in the '187 publication comprises an outer cylinder that extends in a vertical direction. An upper cover and a lower cover close off the top and the bottom of the outer cylinder. An inner cylinder is positioned along the axial centerline of the outer cylinder. A plurality of annular partition plates are positioned along the inner cylinder and extend between the inner cylinder and the outer cylinder. These partition plates divide the annular space between the inner cylinder and the outer cylinder into multiple oil chambers in the vertical direction. The inner peripheral edges of the partition plates are fixed to the outer peripheral surface of the inner cylinder while the outer peripheral edges of the partition plates are spaced from the inner peripheral surface of the outer cylinder.

The inlet of the oil tank is in the upper end of the outer cylinder. The inlet is positioned such that the oil flows into the annular space between the outer cylinder and the inner cylinder. The oil inlet also is positioned such that, when seen in plan view, the oil flows in along the inner peripheral surface of the inner peripheral wall of the outer cylinder. The oil outlet of the tank is formed at the lower end of the outer cylinder such that it opens to the lower end of the annular space defined between the inner and outer cylinders.

The annular space is partitioned by the plural partition plates into plural oil chambers arranged in the vertical direction. The oil chambers are connected by the gap formed between the inner peripheral surface of the outer cylinder and the outer peripheral edges of the partition plates. The upper portion of the uppermost oil chamber of the plural oil chambers is connected to the atmosphere by a blow-by gas discharge pipe. One end of the blow-by gas discharge pipe opens to the upper end portion of the annular space and the pipe then extends through the inside cylinder such that the other end is positioned outside of the oil tank.

In an oil tank constructed in this manner, oil mixed with blow-by gas is pressure-fed into the uppermost annular oil chamber. The mixed oil flows along the inner peripheral surface of the outer cylinder and it spins around inside the oil chamber. The oil and the blow-by gas are separated with the oil going to the outer side and blow-by gas moving to a more central location due to centrifugal forces. The spinning of the oil causes these forces and the differences of the specific gravities of oil and blow-by gas causes the movement. The oil flows down into the lower oil chamber through the gap formed between the outer cylinder and the partition plates, and is discharged to the outside of the oil tank (is supplied to the engine) from an oil discharge port positioned in the lowermost portion of the oil tank. The blow-by gas is dispersed into the atmosphere through the blow-by gas discharge pipe from the uppermost oil chamber inside the oil tank.

Because the oil must flow downward through the gaps formed between the outer cylinder and each of the partition plates, and there has been a limit on increasing the flow volume of oil through the tank. For this reason, it has not been possible to use such an oil tank in an engine requiring a large supply of oil.

Sometimes the conventional oil tank cannot separate the blow-by gas from the oil in the upper oil chamber, and blow-by gas remains in the oil. The blow-by gas cannot rise counter to the oil flowing downward. For this reason, the ability of the conventional oil tank to separate gas and liquid is poor and some of the blow-by gas ends up being supplied to the engine together with the oil.

The conventional oil tank has also had the problem that oil mist floating above the liquid surface in the uppermost oil chamber also ends up being discharged into the atmosphere through the discharge pipe together with the blow-by gas.

SUMMARY OF THE INVENTION

Accordingly, there is a need for an oil tank with improved ability to separate out blow-by gas and/or to separate out oil mist.

One aspect of the present invention involves an oil tank for an engine-driven vehicle. The oil tank comprises a tank body comprising a generally cylindrical inner wall, a top end and a bottom end. The tank body inner wall is joined to the tank body top end and the tank body bottom end. An oil chamber is positioned within the tank body. The oil chamber comprises a generally cylindrical inner wall, a top end and a bottom end. The oil chamber inner wall is joined to the oil chamber top end and the oil chamber bottom end. The oil chamber inner wall is radially spaced from the tank body inner wall. A passage is formed through a lower portion of the oil chamber inner wall such that an oil chamber volume defined within the oil chamber is in fluid communication with a tank body volume defined between the oil chamber and the tank body. A tank oil inlet communicates with the oil chamber volume through an upper portion of the oil chamber wall and a tank oil outlet communicates with the tank body chamber through a lower portion of the tank body. A blow-by gas chamber comprises a blow-by gas inlet that is in fluid communication with an upper portion of tank body and a blow-by gas outlet. The blow-by gas inlet is connected to the blow-by gas outlet by a curved air path.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
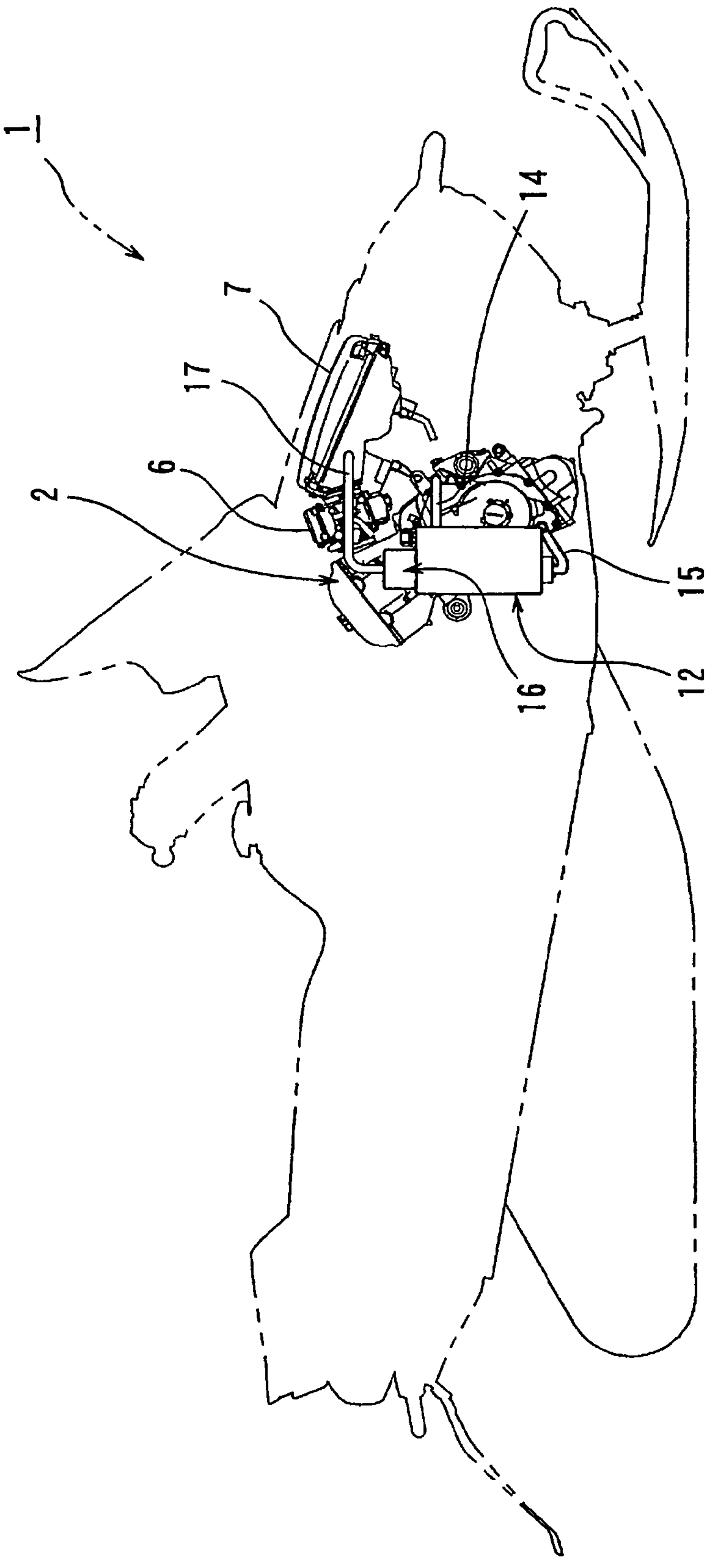
FIG. 1 is side view of a snowmobile engine having an oil tank that is arranged and configured in accordance with certain features, aspects and advantages of the present invention.

With reference now to FIG. 1, a snowmobile 1 is shown that has an engine 2 equipped with an oil tank 12 that is arranged and configured in accordance with certain features, aspects and advantages of the present invention. While the oil tank 12 will be described in the context of the snowmobile 1, certain features, aspects and advantages of the oil tank 12 can be utilized in other vehicles, such as, for example but without limitation, four wheeled vehicles, including automobiles, two wheeled vehicles, including motorcycles and watercraft, including jet-propelled boats and personal watercraft.

Figure 2:
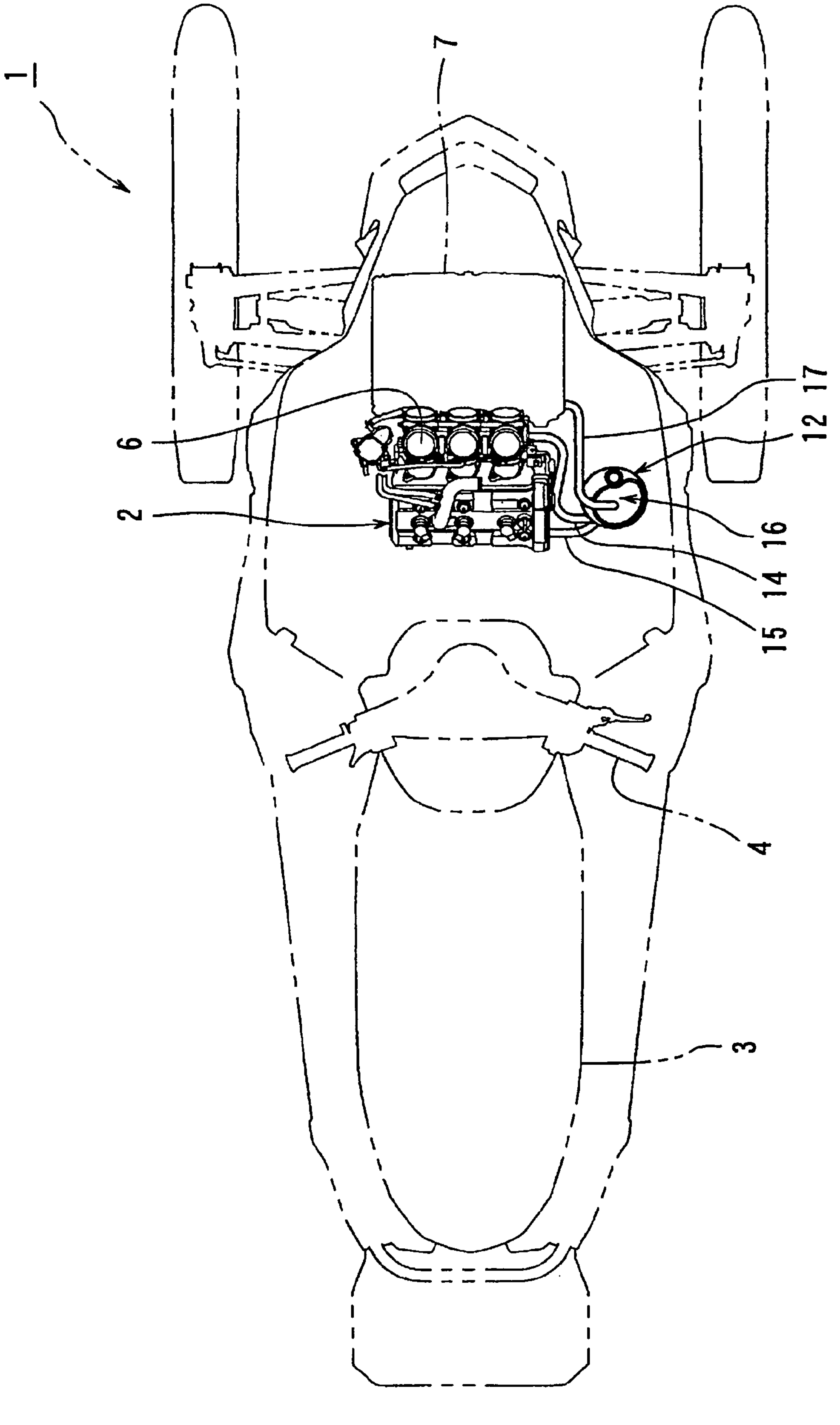
FIG. 2 is a plan view of the engine of FIG. 1.

With reference to FIG. 1 and with additional reference to FIG. 2, the illustrated snowmobile 1 comprises a seat 3 upon which a user and, in some configurations, a passenger are positioned during operation. The seat is generally positioned in the center portion of the vehicle body. A steering handle 4 is positioned forward of at least a portion of the seat and is used to control the direction in which the snowmobile will travel. In some configurations, a throttle control also is mounted to the steering handle 4.

In the illustrated configuration, the engine 2 is a 4-cycle multi-cylinder engine. The illustrated engine 2 is installed with the crankshaft (not shown) extending in a transverse direction. In addition, the engine 2 preferably is installed in a forward portion of the vehicle body and is generally centered relative to the width of the vehicle body. With continued reference to FIGS. 1 and 2, the illustrated engine 2 is generally inclined with the axial centerline of the cylinders being slanted rearward and upward. A carburetor 6 preferably is connected to the front surface of a cylinder head 5 of the engine 2. In the illustrated engine, the engine has one carburetor 6 for each cylinder and the carburetors 6 receive air collectively from a single air cleaner 7. In the illustrated configuration, the air cleaner 7 is disposed in front of and above the engine 2. Other engine configurations also can be used. For instance, some features, aspects and advantages of the present invention may be utility with two-stroke engines, engines having less than four cylinders or more than four cylinders, and engines having differing cylinder configurations and/or differing air supply configurations.

Figure 8:
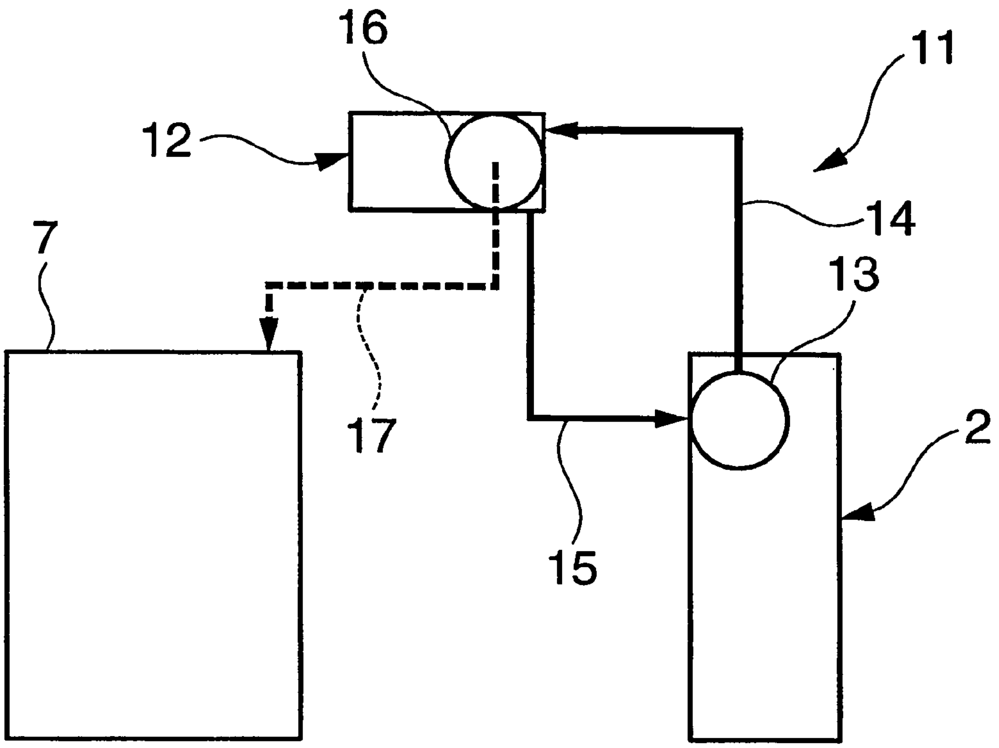
FIG. 8 is a schematic view of a lubricating system of the engine of FIG. 1.

With reference now to FIG. 8, the engine 2 includes a lubrication system 11. The illustrated lubrication system 11 has a configuration which causes oil to circulate through the engine 2 and an oil tank 12. In one configuration, the oil tank 12 can be disposed at the right side of the engine 2. Other positions also are possible. The oil tank 12 is connected by a first oil pipe 14 to an oil discharge port (not shown) of a scavenge pump 13 disposed inside the engine 2, and is connected by a second oil pipe 15 to an oil feed pump (not shown) inside the engine 2. Other suitable configurations also can be used to supply oil to the engine 2 from the tank 12. In addition, as used herein, oil is intended to be broadly defined as a lubricant that is circulated within an engine for reducing friction and/or cooling components of the engine.

The scavenge pump 13 supplies oil from the bottom of the engine 2 to the oil tank 12, and the oil feed pump supplies oil from inside the oil tank 12 to lubricated portions of the engine 2. Any suitable oil delivery system can be used. A breather box 16 can be connected to an upper portion of the oil tank 12. In one configuration, the breather box 16 is connected to the air cleaner 7 by a blow-by gas pipe 17. In another configuration, the breather box 16 is formed integrally with the rest of the oil tank 12 while, in one other configuration, the breather box 16 can be a separate component that is in fluid communication with the oil tank 12.

With reference now to FIGS. 3 to 7, the illustrated oil tank 12 has a tank body 21. Preferably, the tank body 21 generally comprises a closed container. The tank body 21 can have any suitable configuration. An inner cylinder 24 is supported inside the tank body 21 by two partition plates (e.g., an upper partition plate 22 and a lower partition plate 23 in the illustrated arrangement). The inner cylinder 24 can have any suitable configuration keeping in mind the goal of generating a suitable swirl of oil, as described below. The breather box 16 in the illustrated configuration extends upward from the upper portion of the illustrated tank body 21.

In the illustrated configuration, the tank body 21 is formed of a cylinder 25 with a cover plate 26 that closes off one end of the cylinder 25 and a bottom plate 27 that closes off the other end of the cylinder 25. In one configuration, the tank body 21 is disposed at the right side of the engine 2 and a center axis of the tank body 25 is oriented in a substantially vertical direction. The cover plate 26 preferably is positioned generally directly vertically above the bottom plate 27. More preferably, a substantially closed space 28 is defined within the tank body 21 and the closed space preferably is in fluid communication with the inside of the inner cylinder 24 and, even more preferably, the substantially closed space 28 generally envelopes the inner cylinder 24, which is positioned within the tank body 21 in the illustrated configuration.

Figure 5:
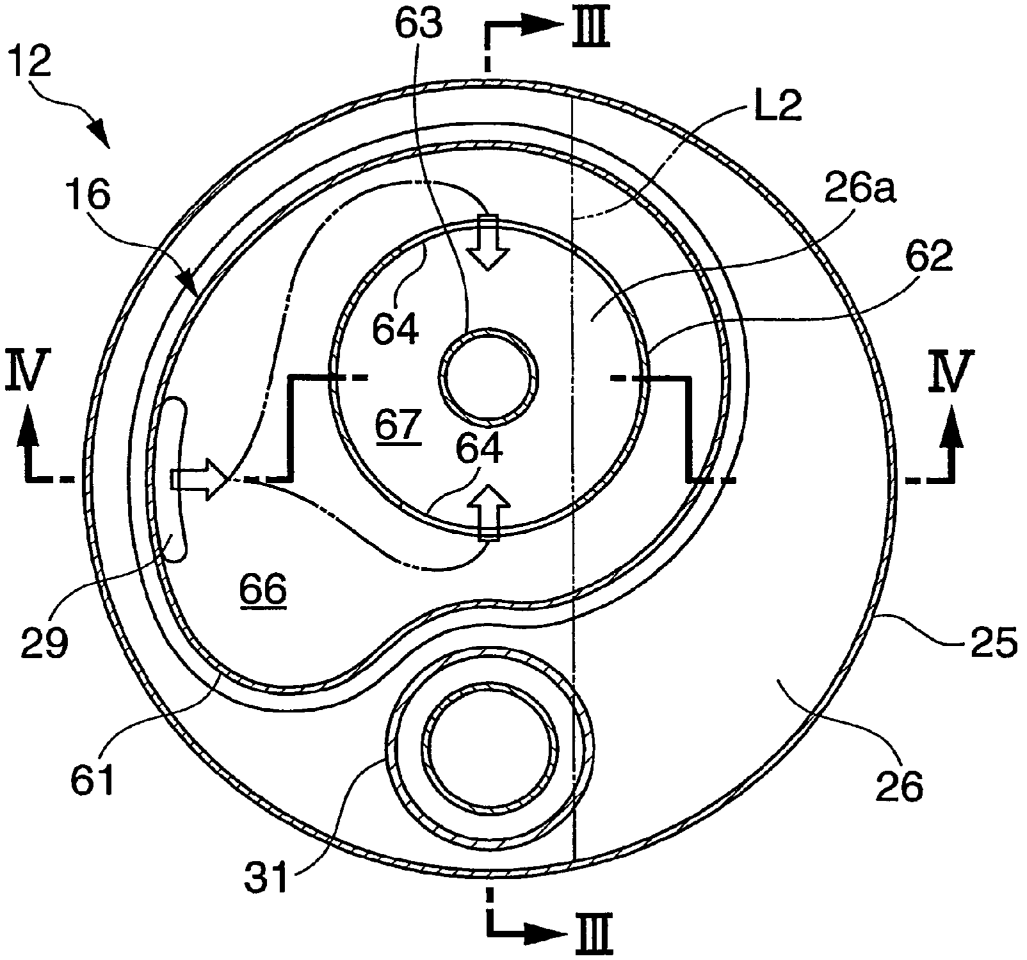
FIG. 5 is a sectioned view taken along the line V-V in FIG. 4.
Figure 6:
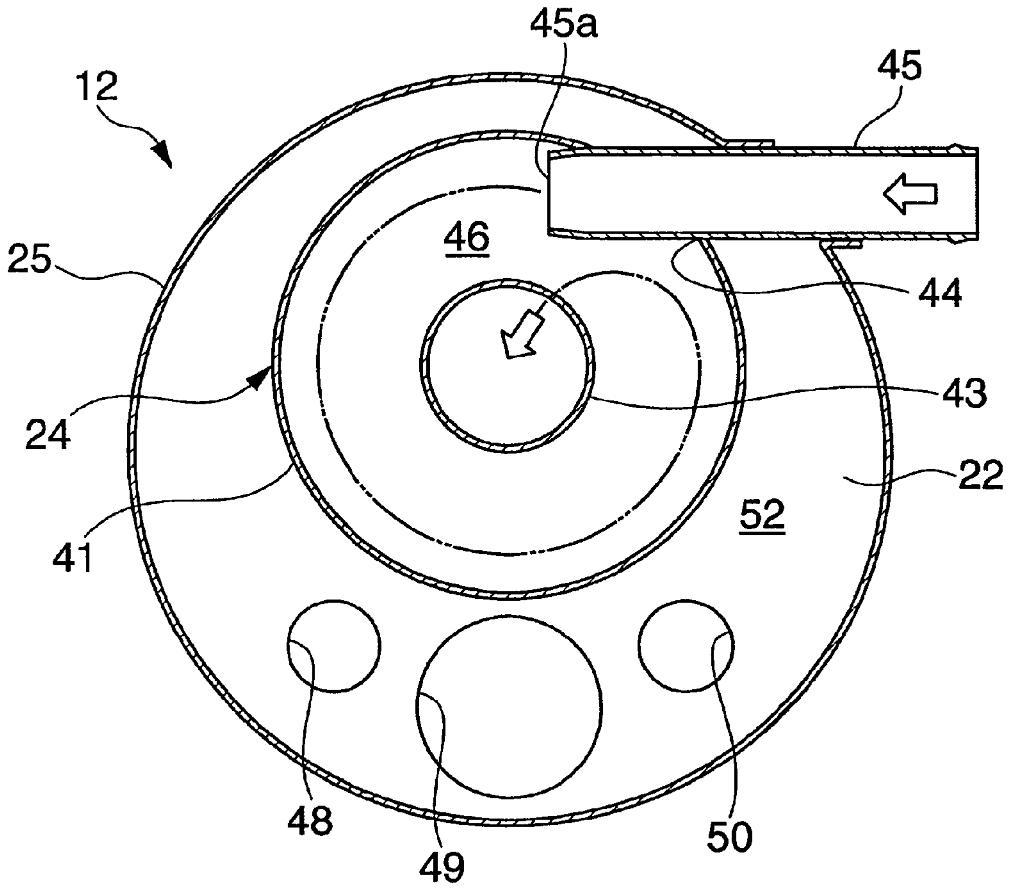
FIG. 6 is a sectioned view taken along the line VI-VI in FIG. 4.
Figure 7:
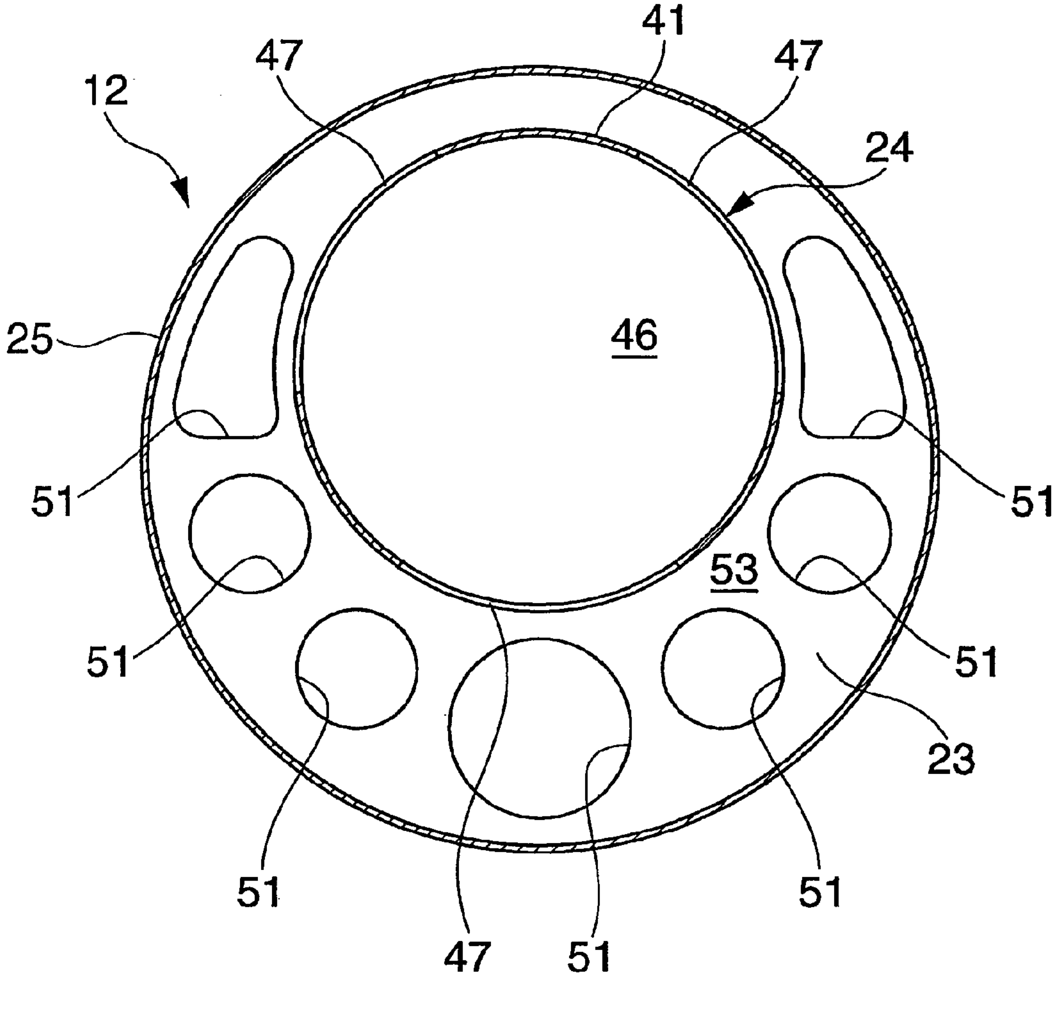
FIG. 7 is a sectioned view taken along the line VII-VII in FIG. 4.

With reference to FIGS. 5 to 7, the cylinder 25 that defines the illustrated tank body 21 is formed such that its transverse sectional shape is substantially circular and generally constant from its upper end to its lower end. Other suitable configurations can be used so long as the purposes of the tank body 21 are accomplished. In the illustrated oil tank 12, the transverse sectional shape of the tank body 21 is substantially constant from its upper end to its lower end. Thus, the speed at which the oil level drops becomes uniform when the oil inside the tank body 21 is supplied to the engine 2 and the oil level drops. For this reason, the oil can be prevented from undulating unnecessarily when it flows inside the tank body 21. Moreover, because the illustrated oil tank 12 has a generally uniform transverse sectional shape, the plate-like members (e.g., the cover plate 26, the bottom plate 27, the upper partition plate 22 and the lower partition plate 23) can be formed from a single common blank.

In the illustrated configuration, the cover plate 26 is formed in a disk shape. The cover plate 26 can be welded to the cylinder 25 such that the outer peripheral portion of the cover plate 26 is sealed with the cylinder 25. In one preferred configuration, the joint between the cover plate 26 and the cylinder 25 is liquid-tight.

With reference again to FIGS. 3 and 4, a convex portion **26*a* can be formed in the cover plate 26 near the radial center of the cover plate 26. The convex portion 26*a* protrudes upward. In some configurations, the convex portion 26*a* can be formed of a member that is secured to an upper surface of the cover plate 26. Regardless of how the convex portion 26*a* is formed, the convex portion 26*a* should protrude upward from the surrounding portion of the cover plate 26. In the illustrated arrangement, the convex portion 26*a* is formed in a circular shape when seen in plan view at a position that is slightly eccentric or off-center relative to the axial center of the cylinder 25. Other positions also can be used. In the illustrated embodiment, the direction in which the convex portion 26***a* is eccentric with respect to the cylinder 25 is toward the rear of the vehicle body (the upper side in FIG. 5).

Figure 4:
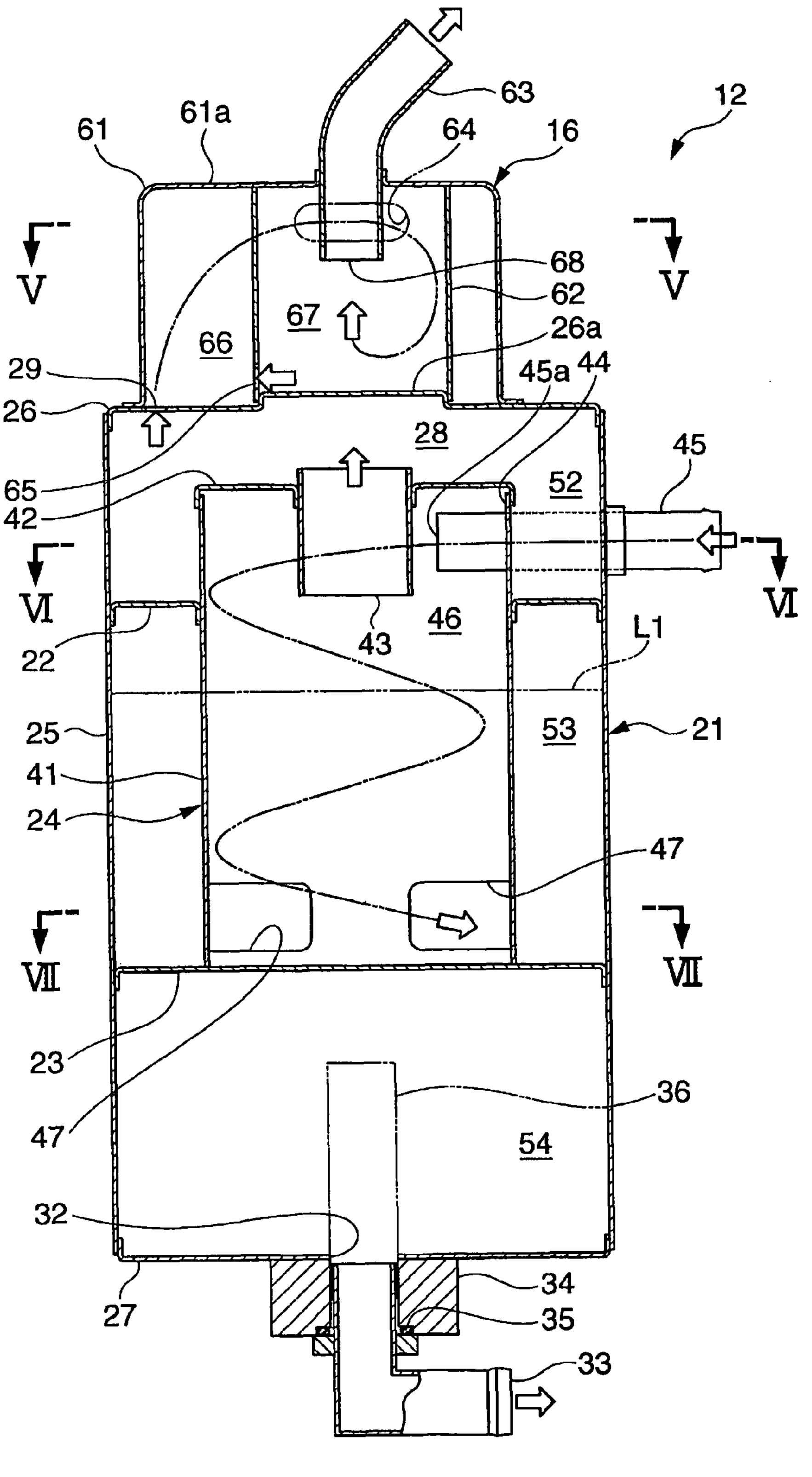
FIG. 4 is a sectioned view of the oil tank of FIG. 1 taken along the line 4-4 in FIG. 2.

With reference now to FIGS. 4 and 5, a blow-by gas inlet 29 is formed through the cover plate 26. In the illustrated arrangement, the inlet 29 comprises a hole that is positioned toward the right side of the vehicle body (the left side in the drawings). Other placements also can be used. In the illustrated oil tank 12, the blow-by gas inlet 29 is at the vehicle body right side. For this reason, when the vehicle body is tilted sideways such that the engine 2 is positioned below the oil tank 12, the blow-by gas inlet 29 is positioned above the oil level indicated by the two-dot chain line L2 in FIG. 5. Thus, the oil inside the tank body 21 does not pass through the blow-by gas inlet 29 and flow into the first blow-by gas chamber 66. As a result, when the vehicle body is tilted such that the engine 2 is positioned below the oil tank 12, the likelihood of oil passing through the blow-by gas pipe 17 and flowing out into the air cleaner 7 can be greatly reduced or eliminated.

Figure 3:
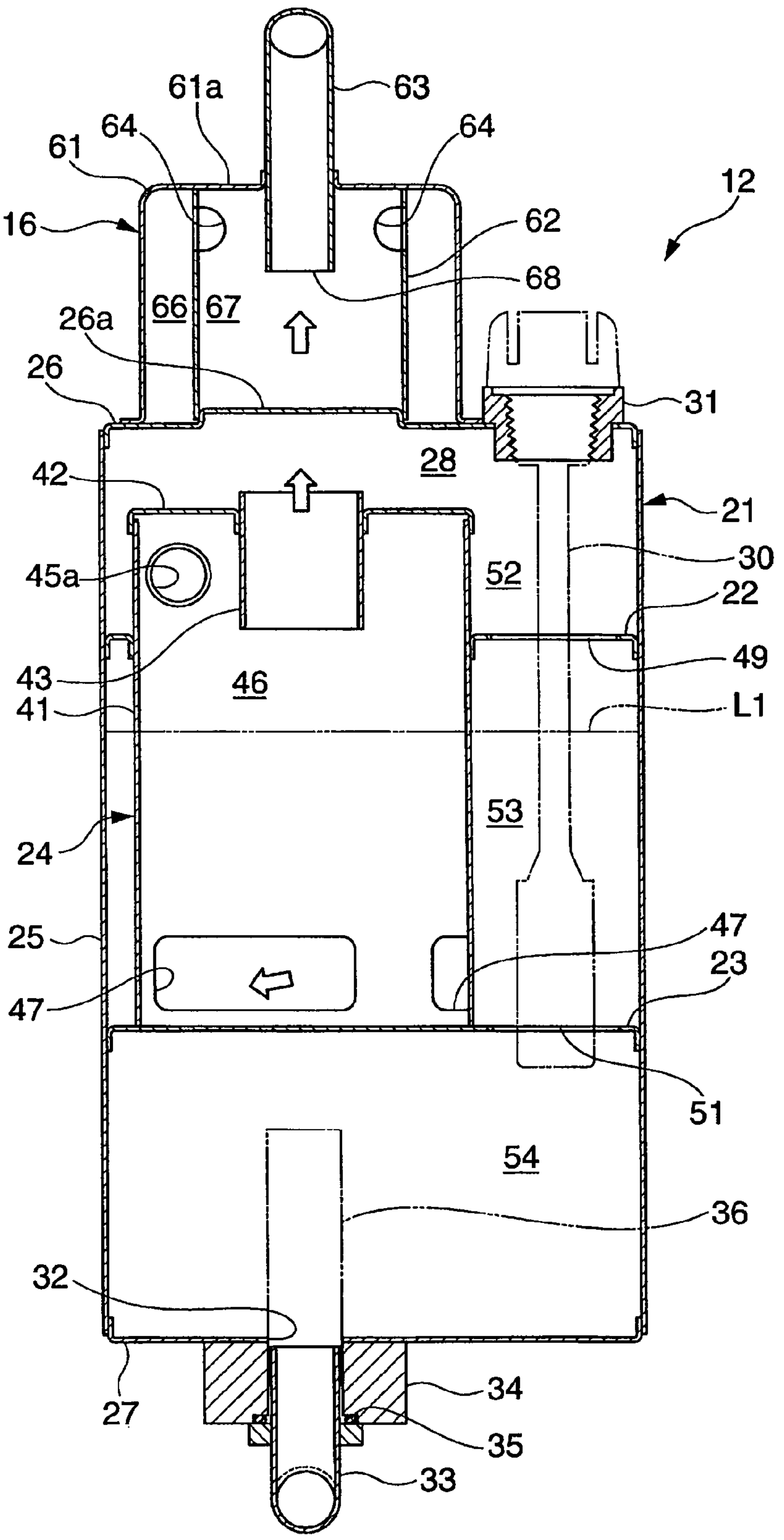
FIG. 3 is a sectioned view of the oil tank of FIG. 1 taken along the line 3-3 in FIG. 2.

With reference now to FIGS. 3 and 5, a threaded insert 31 for supporting an oil level sensor 30 is secured to the cover plate 26. The insert 31 can have any suitable configuration and preferably provides a female threaded surface. In the illustrated arrangement, the insert 31 is positioned on the vehicle body front side of the cover plate 26 (i.e., the right side in FIG. 3 and the lower side in FIG. 5). The oil level sensor 30 is used to detect the level of oil contained within the tank body 21. In the illustrated oil tank 12, the oil level sensor 30 is housed effectively using the space formed at the side of the inner cylinder 24. Thus, the size of the tank body 21 does not increase when it is equipped with the oil level sensor 30.

The bottom plate 27 of the tank body 21 is coupled with the cylinder 25 in any suitable manner. In one configuration, the bottom plate 27 and the cylinder 25 are welded together and, in a preferred configuration, the bottom plate 27 and the cylinder 25 are joined in a fluid-tight manner.

An oil discharge port 32 extends through the bottom plate 27. The oil discharge port 32 preferably comprises a hole through the bottom plate 27. In some configurations, the bottom plate 27 can define a sloping surface with the discharge port 32 being positioned in a lowermost location. The oil discharge port 32 allows oil to drain from the closed space 28 formed inside the tank body 21. In the illustrated oil tank 12, the inner cylinder 24 and the oil discharge port 32 are disposed at positions that are offset toward the vehicle body's rear side with respect to the tank body 21, which causes them to be off-center. Thus, oil can be supplied to the engine 2 from the lowest location when the snowmobile 1 equipped with the illustrated oil tank 12 travels up a slope. For this reason, the oil can be reliably supplied to the lubricated parts of the engine 2 when the load of the engine 2 increases due to the slope.

A pipe coupling 34 connects a pipe member 33 to the oil discharge port 32. The pipe coupling 34 can have any suitable configuration and can be welded to the undersurface of the bottom plate 27 in one configuration. The pipe member 33 connects with the end of the second oil pipe 15. Any suitable coupling can be used to join the pipe member 33 and the second oil pipe 15.

In the illustrated embodiment, an O-ring 35 is positioned where the pipe member 33 and the pipe coupling 34 are connected. The O-ring preferably reduces the likelihood of oil leakage in the region of the pipe coupling 34. A strainer or filter 36 can be positioned within the closed space 28. In some configurations, the filter 36 can be disposed in the pipe connection member 34.

With continued reference to FIGS. 3 and 4, the inner cylinder 24 is configured by a cylinder 41 that extends generally parallel to the cylinder 25 of the tank body 21. In one configuration, the cylinder 41 is generally circular in configuration. Other suitable shapes also can be used. The inner cylinder 24 also comprises a plate member 42 that is welded to the upper end portion of the cylinder 41 such that it closes off the upper end portion of the cylinder 41. In one configuration, the plate member 42 can be generally annular in configuration. Other suitable shapes also can be used. The lower end of the cylinder 41 can be secured to the lower partition plate 23. In one configuration, the lower end of the cylinder 41 is welded to the lower partition plate 23. Preferably, the cylinder 41 and the partition plate 23 are secured in a fluid-tight manner. In the illustrated oil tank 12, a member functioning exclusively as the bottom wall of the inner cylinder 24 becomes unnecessary because the bottom wall of the inner cylinder 24 is configured by the lower partition plate 23.

A tube body 43 can be welded to the plate member 42. In one configuration, the tube body 43 is welded to the center of the plate member 42. In the illustrated configuration, the tube body 43 is positioned on the axial centerline of the cylinder 41 and the tube body 43 preferably is attached to the plate member 42 such that its lower portion faces the inside of the cylinder 41 and is positioned within the cylinder 41.

In the illustrated embodiment, as shown in FIG. 6 and FIG. 7, the inner cylinder 24 is positioned such that it is offset or off-center toward one side in the radial direction with respect to the tank body 21 when seen in plan view. The direction in which the illustrated inner cylinder 24 is offset with respect to the tank body 21 is toward the rear of the vehicle body (the upper side in FIG. 6 and FIG. 7). Other positions also are possible. In the illustrated oil tank 12, however, the inner cylinder 24 is disposed at an eccentric or off-center position with respect to the tank body 21. Thus, the inner cylinder 24 can be more securely fixed to the tank body 21 by the upper partition plate 22 and the lower partition plate 23 at a location where the gap between the inner cylinder 24 and the tank body 21 is relatively narrow.

As shown in FIG. 6, at the upper portion of the cylinder 41 and at the side of the tube body 43, a through hole 44 is formed and a pipe member 45 is inserted into the through hole 44. In one configuration, the pipe member 45 is welded in position. The pipe member 45 can be connected to the first oil pipe 14 in any suitable manner and the pipe member 45 defines an oil inlet for the oil tank 12.

The pipe member 45 can have a tapering end such that it defines a slight nozzle to increase the velocity of the oil flow. In some arrangements, the end of the pipe member 45 does not taper. In addition, the illustrated pipe member 45 penetrates the cylinder 25 of the tank body 21 and extends into the inner cylinder 24. Advantageously, the illustrated pipe member 45 extends into the inner cylinder 24 generally in a tangential direction (e.g., as shown in FIG. 6). In other words, an extension of an axial centerline of the pipe member 45 preferably does not intersect the center of the inner cylinder 24. In addition, in the illustrated arrangement, the pipe member 45 is positioned generally between the cylinder 41 and the tube body 43. The tube body 43 preferably extends downward beyond the lowermost portion of the pipe member 45.

Thus, the oil tank 12 is configured such that the oil flies through the air when it flows into the inner cylinder 24 from the pipe member 45. Thus, the oil tank 12 can directly disperse, into the air chamber inside the inner cylinder 24, the blow-by gas included in the vicinity of the oil surface. Oil flowing at a predetermined flow rate into the inner cylinder 24 from the pipe member 45 flows along the inner peripheral surface of the cylinder 41 due to inertia. Preferably, the oil flows inside an oil chamber 46, which is formed inside the inner cylinder 24, such that it is generally circular in plan view and such that the oil becomes a spiral flow along the inner peripheral surface of the cylinder 41.

With reference to FIG. 3, FIG. 4 and FIG. 7, communication holes 47 that extend from the inside of the cylinder 41 to the inside of the closed space 28 preferably are formed in the peripheral wall that defines the lower portion of the cylinder 41. The communication holes 47 can be formed in any number of locations. In the illustrated arrangement, the communication holes 47 are formed at three places in the circumferential direction of the cylinder 41 in a lower region of the cylinder 41. In the illustrated oil tank 12, the communication holes 47 are formed in the lower portion of the inner cylinder 24. Thus, the blow-by gas has largely separated from the oil before it passes through the communication holes 47 and flows into the second space 53. For this reason, it becomes difficult for bubbles to form when the oil flows into the second space 53.

In the illustrated arrangement, the upper partition plate 22, which supports the upper portion of the inner cylinder 24, is formed in an annular shape. The inner cylinder 24 extends through the upper partition plate 22. The upper partition plate is joined the inside of the cylinder 25 of the tank body 21 in any suitable manner. In one configuration, the upper partition plate 22 is welded to the cylinder 25. The upper portion of the inner cylinder 24 is suitably secured to the upper partition plate 22. In the illustrated configuration, the inner cylinder 24 is welded to the upper partition plate 22. Thus, the inner cylinder 24 is supported in the tank body 21 via the upper partition plate 22.

As shown in FIG. 6, through holes 48, 49 and 50 extend through the upper partition plate 22. These holes 48, 49, 50 are disposed at three places in sites (sites at the vehicle body front side) in the upper partition plate 22 opposite of the offset inner cylinder 24. The through hole 49 preferably has a larger diameter than the other two holes 48, 50 and the oil level sensor 30 preferably is inserted through the enlarged hole 49.

The lower partition plate 23 supporting the lower portion of the inner cylinder 24 is joined with the inside of the cylinder 25 of the tank body 21 and, in some configurations, is welded to the cylinder 25. As shown in FIG. 7, plural through holes 51 are disposed at sites in the lower partition plate 23 on the outer side of the inner cylinder 24. Thus, in the illustrated oil tank 12, the oil can be prevented from undulating inside the closed space 28 using the upper partition plate 22 and the lower partition plate 23, which are members for retaining the inner cylinder 24 inside the tank body 21, are baffles. For this reason, the number of parts can be reduced in comparison to the case where the oil tank is equipped with a stay for exclusively retaining the inner cylinder 24 and a baffle member exclusively used for preventing the oil from undulating.

Because the inner cylinder 24 is supported in the tank body 21 by the upper partition plate 22 and the lower partition plate 23, the closed space 28 inside the tank body 21 is partitioned into a first space 52 positioned above the upper partition plate 22, a second space 53 positioned between the partition plates 22 and 23, and a third space 54 positioned below the lower partition plate 23.

The illustrated tank body 21 is configured such that during ordinary use, the oil level is positioned generally at the height indicated by the two-dot chain line L1 in FIG. 3 and in FIG. 4. Namely, the first space 52 is filled substantially exclusively with blow-by gas, the second space 53 is filled with oil in its lower portion and with blow-by gas in its upper portion, and the third space 54 is filled substantially exclusively with oil.

As shown in FIGS. 3 to 5, the breather box 16 is generally defined by a housing 61, which protrudes upward from the cover plate 26 of the tank body 21, and a cylinder 62, which is disposed inside the housing 61. In the illustrated oil tank 12, the bottom of the breather box 16 is defined by the cover plate 26 of the tank body 21. Thus, a part dedicated to being the bottom of the breather box 16 becomes unnecessary and the number of components can be reduced as can the weight of the oil tank 12.

In the illustrated embodiment, the housing 61 has the shape of a bottomed cylinder that opens downward. Other configurations also are possible. As shown in FIG. 5, the illustrated housing 61 is also formed such that it is elongated in the left-right direction when seen in plan view. The housing 61 according to this embodiment is formed such that it protrudes toward the vehicle body right side (the left side in FIG. 4 and FIG. 5) with respect to the inner cylinder 24 when seen in plan view. According to this embodiment, a space is formed in the area above the tank body 21 to the front and left of the housing 61. The threaded insert 31 is disposed in this space. Other configurations are possible.

The end portion of the housing 61 at the vehicle body right side (the end portion at the left side in FIG. 5) is formed such that covers, from above, the blow-by gas inlet 29 that extends through the cover plate 26. A pipe member 63 extends through and, in some configurations, can be welded to an upper wall 61*a* of the housing 61 at a site that generally intersects the extension line of the axial centerline of the inner cylinder 24. Other placements can also be used. The pipe member 63 can be connected to the blow-by gas pipe 17 in any suitable manner. The lower end of the pipe member 63 is positioned in the vicinity of the center of the housing 61 in the vertical direction. Again, other configurations are possible.

The position of the pipe member 63 in the left-right direction is also positioned at the vehicle body right side (the left side in FIG. 5) from the two-dot chain line L2 shown in FIG. 5. The two-dot chain line L2 represents the height of the oil level when the oil tank 12 is tilted to a worst case degree. Namely, as shown in FIG. 5, the opening in the lower end of the pipe member 63 will be positioned above the oil level L2 in FIG. 5 when the oil tank 12 reaches a worst-case scenario of tilting. For this reason, even when the vehicle body is tilted sideways such that the engine 2 is positioned below the oil tank 12, the oil does not flow out toward the air cleaner 7 from the blow-by gas outlet. In particular, when the vehicle body is tilted sideways during maintenance, it becomes unnecessary to discharge the oil from the oil tank 12 so that maintenance can be easily conducted.

Upper communication holes 64 extend through the cylinder 62 such that the inside and the outside of the cylinder 62 are placed in communication. In the illustrated arrangement, the holes 64 are disposed in the peripheral wall at the upper portion of the cylinder 62 of the breather box 16. The cylinder 62 can be welded to, and/or supported on, the upper wall 61*a* of the housing 61. As shown in FIG. 3 and FIG. 5, the upper communication holes 64 can be formed in the end portion at the vehicle body front side and in the end portion at the vehicle body rear side of the cylinder 62. In a preferred configuration, the upper communication holes 64 are formed at positions at about the same height and generally higher than the lower end of the pipe member 63.

With reference to FIG. 3 and FIG. 4, the lower end portion of the cylinder 62 preferably receives the convex portion 26*a* of the cover plate 26. Thus, the cylinder 62 preferably is positioned on the same axial line as the inner cylinder 24. As shown in FIG. 4, a lower communication hole 65 that communicates the inside and the outside of the cylinder 62 can be disposed in the lower end portion of the cylinder 62. Any lubricant that happens to make its way into the cylinder will drop from the air as it is drawn into the pipe member 63 and will spill out of the communication hole 65 into a first blow-by gas chamber 66.

The first blow-by gas chamber 66, which is formed between the housing 61 and the cylinder 62, and a second blow-by gas chamber 67, which is formed inside the cylinder 62, are formed inside the breather box 16 according to this embodiment. In this embodiment, what is called a curved air path in the present invention is configured by the first and second blow-by gas chambers 66 and 67, the blow-by gas inlet 29, the upper communication holes 64, and the opening 68 in the lower end of the pipe member 63. A blow-by gas outlet of the breather box 16 is defined by the opening 68 in the lower end of the pipe member 63.

In the oil tank 12 configured in this manner, the scavenge pump 13 is driven together with the engine 2, whereby the oil flows at a predetermined flow speed into the inner cylinder 24 from the pipe member 45 disposed in the upper portion of the inner cylinder 24. The oil flows into the inner cylinder 24 from a position higher than the oil level L1. Thus, the oil momentarily flies through the air before striking the inner peripheral surface of the inner cylinder 24, and then flows along this inner peripheral surface. The oil flows in a spiral flow pattern inside the inner cylinder 24. Thus, the oil spins around the inside of the inner cylinder 24 whereby the blow-by gas entrained in the oil is separated from the oil by centrifugal separation.

The oil flows downward while spiraling inside the inner cylinder 24, and passes through the communication holes 47 formed in the lower end portion of the inner cylinder 24, whereby it flows out into the second space 53 from the inside of the inner cylinder 24. At this time, the oil enters the communication holes 47 due to centrifugal force because the oil flows along the peripheral wall of the inner cylinder 24. When the oil enters the second space 53 from the inside of the inner cylinder 24, its flow speed drops and the direction in which it flows changes downward. Together with this, the blow-by gas that remains in the oil without having been separated inside the inner cylinder 24 rises and separates from the oil as a result of the change occurring in the flow of the oil inside the second space 53. Thereafter, the oil passes through the through holes 51 in the lower partition plate 23, flows into the third space 54 positioned therebelow, and is supplied from here to the engine 2 by the second oil pipe 15 including the pipe member 33. The illustrated oil tank 12 supplies the oil to the engine from the bottom portion of the tank body 21, into which the oil flows after the blow-by gas has been separated therefrom. Thus, just oil that is not mixed with blow-by gas, or oil mixed with a miniscule amount of blow-by gas, can be supplied to the engine 2.

The illustrated inner cylinder 24 of the oil tank 12 advantageously does not have any other members disposed in the axial center portion. For this reason, the blow-by gas collecting at the center portion due to the principle of centrifugal separation is not obstructed by another member when it moves upward. Thus, the blow-by gas can be efficiently separated. Intake air negative pressure acts inside the oil tank 12 including the inside of the breather box 16 while the engine 2 is running. Thus, the blow-by gas separated from the oil inside the inner cylinder 24 passes through the tube body 43 inside the tank body 21 and enters the first space 52.

The blow-by gas separated from the oil inside the second space 53 passes through the through holes 48 to 50 in the upper partition plate 22 and enters the first space 52. The blow-by gas inside the first space 52 passes through the blow-by gas inlet 29 formed in the cover plate 26 and enters the first blow-by gas chamber 66 inside the breather box 16.

The blow-by gas flowing into the first blow-by gas chamber 66 flows upward as indicated by the arrow in FIG. 4 and FIG. 5 while separating the inside of the first blow-by gas chamber 66 into a vehicle body front side and a vehicle body rear side, passes through the upper communication holes 64 formed in the cylinder 62, and flows into the second blow-by gas chamber 67 inside the cylinder 62. Because the blow-by gas moves in this manner while curving in the horizontal direction and the vertical direction inside the first blow-by gas chamber 66, oil mist included in the blow-by gas adheres to the housing 61 and the cylinder 62 and is separated from the blow-by gas.

The blow-by gas flowing into the second blow-by gas chamber 67 similarly moves while curving in the horizontal direction and the vertical direction and is sucked into the pipe member 63, because the upper communication holes 64 are positioned above the opening in the lower end of the pipe member 63. For this reason, oil mist can be separated from the blow-by gas even in the second blow-by gas chamber 67. The oil separated from the blow-by gas inside the second blow-by gas chamber 67 passes through the lower communication hole 65 formed in the lower end portion of the cylinder 41 and flows into the first blow-by gas chamber 66. This oil, and the oil separated from the blow-by gas inside the first blow-by gas chamber 66, passes through the blow-by gas inlet 29 opening to the bottom of the first blow-by gas chamber 66 and flows into the tank body 21.

The oil tank 12 is configured to accommodate a high rate of oil flow because the oil is forcibly discharged from the inner cylinder 24 into the second space 53 by centrifugal force. Also, because the oil tank 12 can separate the blow-by gas from the oil in at least two places (e.g., inside of the inner cylinder 24 and inside of the closed space 28) gas/liquid separation is sufficiently conducted, and oil mist included in the blow-by gas can be more effectively separated and removed by the first and second blow-by gas chambers 66 and 67.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An oil tank for an engine-driven vehicle, the oil tank comprising:

a tank body comprising a generally cylindrical inner wall, a top end and a bottom end, the tank body inner wall being joined to the tank body top end and the tank body bottom end, an oil chamber positioned within the tank body, the oil chamber comprising a generally cylindrical inner wall, a top end and a bottom end, the oil chamber inner wall being joined to the oil chamber top end and the oil chamber bottom end, the oil chamber inner wall being radially spaced from the tank body inner wall;

a passage being formed through a lower portion of the oil chamber inner wall such that an oil chamber volume defined within the oil chamber is in fluid communication through the passage with a tank body volume defined between the oil chamber and the tank body;

a tank oil inlet communicating with the oil chamber volume through an upper portion of the oil chamber wall and a tank oil outlet communicating with the tank body chamber through a lower portion of the tank body; and a blow-by gas chamber comprising a blow-by gas inlet that is external to the oil chamber and in fluid communication with an upper portion of the tank body and a blow-by gas outlet, the blow-by gas inlet being connected to the blow-by gas outlet by a curved air path.

2. The oil tank of claim 1, wherein the tank oil inlet is positioned higher than an operational oil level defined within the oil chamber volume.

3. The oil tank of claim 2, wherein a partition plate is disposed inside the tank body, the inner cylinder is fixed to the partition plate and the partition plate is fixed to the tank body, the partition plate comprising a passage such that an upper space positioned above the partition plate and a lower space positioned below the partition plate are in fluid communication.

4. The oil tank of claim 2, wherein the oil chamber is disposed at an off-center position relative to the tank body bottom end.

5. The oil tank of claim 2, wherein the blow-by gas outlet is positioned higher than the operational oil level defined within the oil chamber volume when the tank body is tilted to one side.

6. The oil tank of claim 5, wherein the oil chamber also comprises a generally cylindrical outer wall, the tank body inner wall extends generally parallel to the oil chamber outer wall and the transverse sectional shape of the tank body is substantially constant from the tank body upper end to the tank body bottom end.

7. The oil tank of claim 6, wherein the oil chamber is disposed at an off-center position relative to the tank body bottom end.

8. The oil tank of claim 6, wherein a partition plate is disposed inside the tank body, the inner cylinder is fixed to the partition plate and the partition plate is fixed to the tank body, the partition plate comprising a passage such that an upper space positioned above the partition plate and a lower space positioned below the partition plate are in fluid communication.

9. The oil tank of claim 1, wherein the blow-by gas outlet is positioned higher than the operational oil level defined within the oil chamber volume when the tank body is tilted to one side.

10. The oil tank of claim 9, wherein the oil chamber also comprises a generally cylindrical outer wall, the tank body inner wall extends generally parallel to the oil chamber outer wall and the transverse sectional shape of the tank body is substantially constant from the tank body upper end to the tank body bottom end.

11. The oil tank of claims 10, wherein the oil chamber is disposed at an off-center position relative to the tank body bottom end.

12. The oil tank of claim 11, wherein a partition plate is disposed inside the tank body, the inner cylinder is fixed to the partition plate and the partition plate is fixed to the tank body, the partition plate comprising a passage such that an upper space positioned above the partition plate and a lower space positioned below the partition plate are in fluid communication.

13. The oil tank of claim 1, wherein the oil chamber also comprises a generally cylindrical outer wall, the tank body inner wall extends generally parallel to the oil chamber outer wall and the transverse sectional shape of the tank body is substantially constant from the tank body upper end to the tank body bottom end.

14. The oil tank of claim 1, wherein a partition plate is disposed inside the tank body, the inner cylinder is fixed to the partition plate and the partition plate is fixed to the tank body, the partition plate comprising a passage such that an upper space positioned above the partition plate and a lower space positioned below the partition plate are in fluid communication.

15. The oil tank of claim 14, wherein the partition plate is positioned vertically lower than the passage that is formed through the lower portion of the oil chamber inner wall, and the oil tank outlet extends to the lower space that is positioned below the partition plate.

16. The oil tank of claim 15, wherein the oil chamber bottom end is formed by the partition plate.

17. The oil tank of claim 1, wherein the oil chamber is disposed at an off-center position relative to the tank body bottom end.

18. The oil tank of claim 17, wherein the oil chamber and the oil tank outlet are both disposed in an off-center position relative to the tank body bottom end.

19. The oil tank of claim 17, wherein an oil level sensor extends into the oil tank at a first location where a spacing between the tank body and the oil chamber is small at a location other than the first location because of the off-center positioning of the oil chamber relative to the tank body bottom end.

20. The oil tank of claims 17, wherein the blow-by gas chamber also is positioned off-center relative to the tank body bottom end.

* * * * *